(12) United States Patent
Ikeda

(10) Patent No.: US 8,760,830 B2
(45) Date of Patent: *Jun. 24, 2014

(54) ESD PROTECTION DEVICE

(71) Applicant: Murata Manufacturing Co., Ltd., Nagaokakyo (JP)

(72) Inventor: Tetsuya Ikeda, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,317

(22) Filed: Nov. 19, 2012

(65) Prior Publication Data

US 2013/0077199 A1  Mar. 28, 2013

Related U.S. Application Data

(63) Continuation of application No. PCT/JP2011/061280, filed on May 17, 2011.

(30) Foreign Application Priority Data

May 20, 2010  (JP) .................................. 2010-116557

(51) Int. Cl.
*H02H 9/06* (2006.01)

(52) U.S. Cl.
USPC .......................................................... 361/56

(58) Field of Classification Search
USPC ........................................................... 361/56
See application file for complete search history.

(56) References Cited

U.S. PATENT DOCUMENTS

| | | | |
|---|---|---|---|
| 8,238,069 B2 * | 8/2012 | Adachi et al. | ................... 361/56 |
| 2009/0002906 A1 | 1/2009 | Liu et al. | |
| 2009/067113 A1 | 3/2009 | Urakawa | |
| 2010/0309595 A1 | 12/2010 | Adachi et al. | |
| 2011/0026186 A1 | 2/2011 | Katsumura et al. | |
| 2011/0038088 A1 | 2/2011 | Noma et al. | |
| 2011/0222197 A1 | 9/2011 | Adachi et al. | |

FOREIGN PATENT DOCUMENTS

| | | | |
|---|---|---|---|
| JP | 08-017548 | A | 1/1996 |
| JP | 10-022043 | A | 1/1998 |
| JP | 10-312876 | A | 11/1998 |
| JP | 2000-077162 | A | 3/2000 |
| JP | 2000-277229 | A | 10/2000 |
| JP | 2004-127614 | A | 4/2004 |
| JP | 2006-049065 | A | 2/2006 |
| JP | 2006-120567 | A | 5/2006 |
| JP | 2009-301819 | A | 12/2009 |
| WO | 2008/146514 | A1 | 12/2008 |
| WO | 2009/098944 | A1 | 8/2009 |
| WO | 2009/136535 | A1 | 11/2009 |
| WO | 2010/061550 | A1 | 6/2010 |

OTHER PUBLICATIONS

Official Communication issued in International Patent Application No. PCT/JP2011/061280, mailed on Aug. 16, 2011.

* cited by examiner

*Primary Examiner* — Ronald W Leja
(74) *Attorney, Agent, or Firm* — Keating & Bennett, LLP

(57) ABSTRACT

A highly reliable ESD protection device that prevents failure of discharge and variation of a discharge start voltage even when protection from static electricity is repeatedly performed includes a cavity provided in a ceramic multilayer substrate. First and second discharge electrodes are provided in the ceramic multilayer substrate and face each other across a gap. A tip of the first discharge electrode and a tip of the second discharge electrode are positioned at edges of the cavity or at positions receded from the edges.

20 Claims, 8 Drawing Sheets

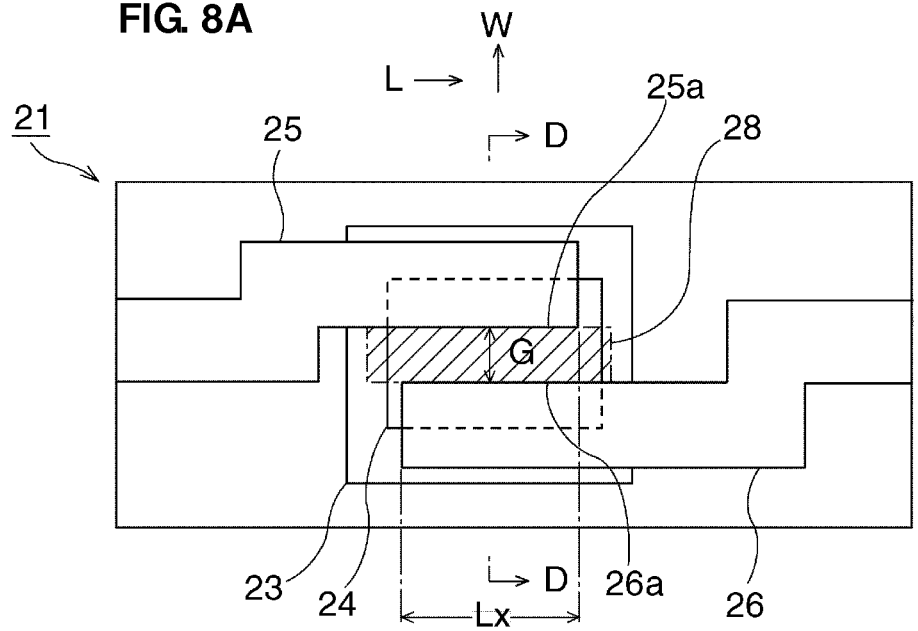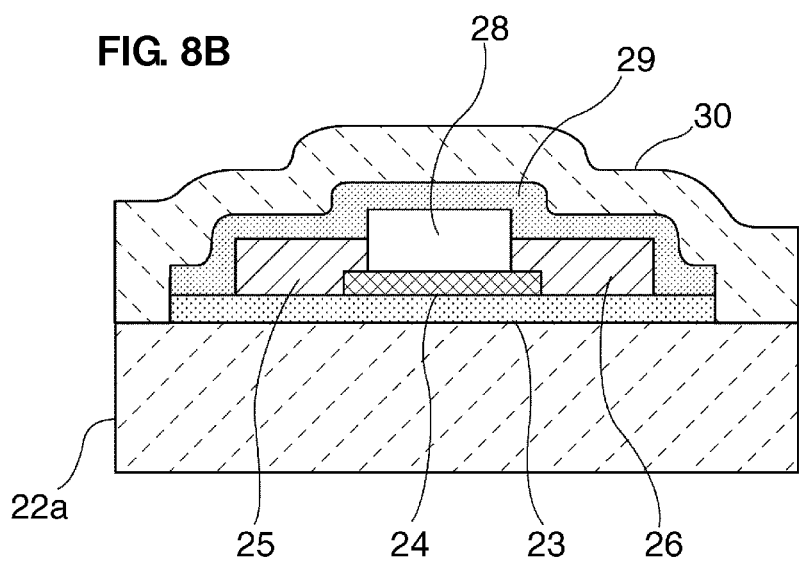

ESD PROTECTION DEVICE

BACKGROUND OF THE INVENTION

1. Field of the Invention

The present invention relates to an ESD protection device that protects an electronic component or an electronic circuit from static electricity, and more particularly relates to an ESD protection device that includes first and second discharge electrodes facing each other across a certain gap in a ceramic multilayer substrate.

2. Description of the Related Art

Various known ESD protection devices 101 have been used to protect semiconductor devices or electronic circuits from static electricity.

For example, an ESD protection device illustrated in FIGS. 9A and 9B is disclosed in WO2008/146514 described below. An ESD protection device 101 includes a ceramic multilayer substrate 102. A cavity 103 is formed in the ceramic multilayer substrate 102. Also, a first discharge electrode 104 and a second discharge electrode 105 are arranged in the ceramic multilayer substrate 102. Tip portions of the first discharge electrode 104 and the second discharge electrode 105 are positioned in the cavity 103. As illustrated in FIG. 9A, the tip portions of the first and second discharge electrodes 104 and 105 face each other across a gap G in the cavity 103. Also, a mixture part 106 is arranged on the underside of the cavity 103. The mixture part 106 is connected to the underside of the first and second discharge electrodes 104 and 105 to connect the first and second discharge electrodes 104 and 105.

Details of the mixture part 106 are as illustrated in FIG. 9B. In the mixture part 106, conductive particles 106a coated with an inorganic material having no electric conductivity are dispersed in a ceramic material.

In the ESD protection device 101 described in WO2008/146514, creeping discharge and aerial discharge between the first and second discharge electrodes 104 and 105, which face into the cavity 103, are utilized. Here, the discharge start voltage is assumed to be adjustable by providing the mixture part 106.

However, in the ESD protection device 101, there is a problem that, when discharge is repeated between the first and second discharge electrodes 104 and 105, the discharge start voltage increases, or discharge does not occur even when static electricity is applied.

SUMMARY OF THE INVENTION

Preferred embodiments of the present invention provide a highly reliable ESD protection device in which, even when discharge is repeatedly performed, an increase in the discharge start voltage is much less likely to occur, and discharge can be surely performed when static electricity is applied.

An ESD protection device according to a preferred embodiment of the present invention includes a ceramic multilayer substrate including a cavity; first and second discharge electrodes that are located in the ceramic multilayer substrate and that face each other across a gap and first and second outer electrodes located on surfaces of the ceramic multilayer substrate; wherein the first and second outer electrodes are electrically connected to the first and second discharge electrodes, a tip of the first discharge electrode and a tip of the second discharge electrode are positioned at edges of the cavity or at positions receded from the edges, and the tip of the first discharge electrode and the tip of the second discharge electrode face each other across the gap.

In a specific aspect of the ESD protection device according to a preferred embodiment of the present invention, the tip of the first discharge electrode and the tip of the second discharge electrode are positioned at edges of the cavity. In that case, discharge can be more surely performed when static electricity is applied between the first and second discharge electrodes.

In a specific aspect of the ESD protection device according to a preferred embodiment of the present invention, the ceramic multilayer substrate includes a first substrate layer and a second substrate layer. The cavity is provided on a boundary between the first and second substrate layers. The first and second discharge electrodes are provided on the surface, facing the second substrate layer, of the first substrate layer.

In another specific aspect of the ESD protection device according to a preferred embodiment of the present invention, the ESD protection device further includes an auxiliary electrode arranged in the ceramic multilayer substrate to connect the first discharge electrode with the second discharge electrode. The auxiliary electrode includes a metal particle dispersed body including a surface that is coated with an inorganic material having no electric conductivity. In this case, the discharge start voltage can be adjusted to an appropriate magnitude, and an increase in the discharge start voltage when discharge is repeatedly performed can be more effectively suppressed.

The auxiliary electrode may be placed on undersides of the first and second discharge electrodes, or may be positioned in an upper portion of the cavity, for example.

In yet another specific aspect of the ESD protection device according to a preferred embodiment of the present invention, the auxiliary electrode further includes a ceramic material.

In yet another aspect of the ESD protection device according to a preferred embodiment of the present invention, the ceramic multilayer substrate includes a glass component, and a sealing layer including a ceramic having a sintering temperature that is higher than that of a material constituting the ceramic multilayer substrate is provided in at least a portion of a region around the cavity in the ceramic multilayer substrate. In this case, the glass component in the ceramic substrate can be prevented from permeating into and/or through the interior of the cavity and eroding an insulating material coating the auxiliary electrode material or an insulating material dispersed through the auxiliary electrode, which causes a reduction in the insulation performance between the discharge electrodes. Therefore, undesired short circuits and breakage is reliably prevented.

The sealing layer may include a top sealing layer arranged to be exposed to a top side of the cavity. In this case, the top sealing layer is arranged to reach a top side of the first and second discharge electrodes. Therefore, with the top sealing layer, breakage in upper portions of the first and second discharge electrodes of the ESD protection device is effectively prevented.

In a preferred embodiment of the present invention, the sealing layer may include a bottom sealing layer provided on an underside of the discharge electrode. In this case, with the bottom sealing layer, breakage in lower portions of the first and second discharge electrodes is effectively prevented.

In yet another specific aspect of the ESD protection device according to a preferred embodiment of the present invention, given a length direction of the ceramic multilayer substrate and a width direction that is a direction orthogonal to the length direction, the tip of the first discharge electrode and the tip of the second discharge electrode facing each other across the gap extend along the length direction, and face each other in the width direction. In this case, because the opposing length can be elongated, the resistance against repetition, upon protection from static electricity, can be further enhanced.

According to the ESD protection device according to a preferred embodiment of the present invention, the tip of the first discharge electrode and the tip of the second discharge electrode are preferably positioned at the edges of the cavity. Therefore, excluding the tip sides of the first and second discharge electrodes, the tips of the first and second discharge electrodes and adjacent portions thereof are embedded in the ceramic multilayer substrate. Thus, even when discharge is repeatedly performed, electrode peeling off at the tip portions of the first and second discharge electrodes is much less likely to occur. As a result, even when discharge is repeatedly performed, the discharge start voltage is less likely to increase, and discharge failing to occur is much less likely. Therefore, even when discharge is repeated many times, protection from static electricity can be surely performed. Thus, the reliability of the ESD protection device is effectively and significantly enhanced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8A is a schematic plan view illustrating the electrode structure of an ESD protection device according to a second preferred embodiment of the present invention, and FIG. 8B is a sectional view of the entire ESD protection device corresponding to a portion along the D-D line in FIG. 8A.

DETAILED DESCRIPTION OF THE PREFERRED EMBODIMENTS

Hereinafter, the present invention will be explained by describing specific preferred embodiments of the present invention with reference to the drawings.

Figure 1A:
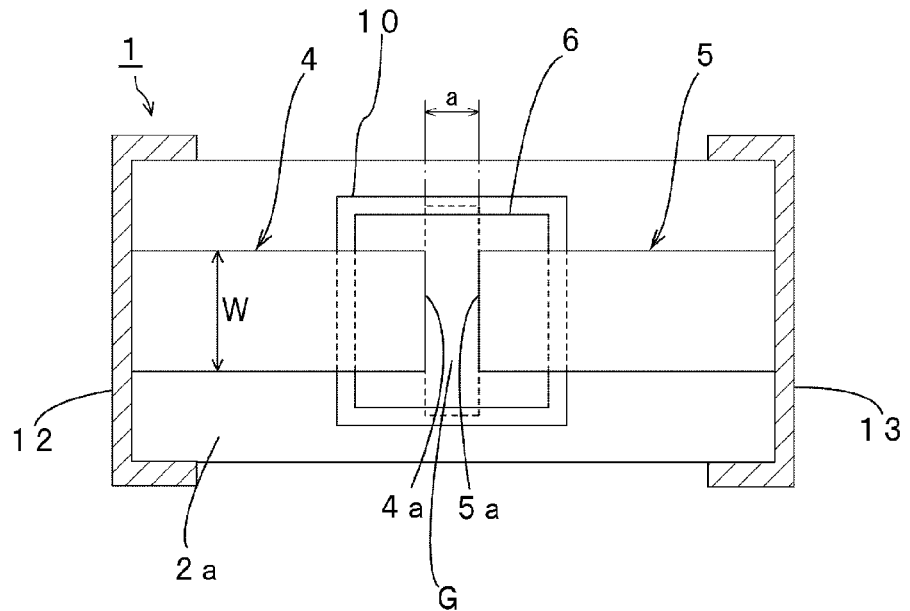
FIG. 1A is a plan sectional view of an ESD protection device according to a first preferred embodiment of the present invention.
Figure 1B:
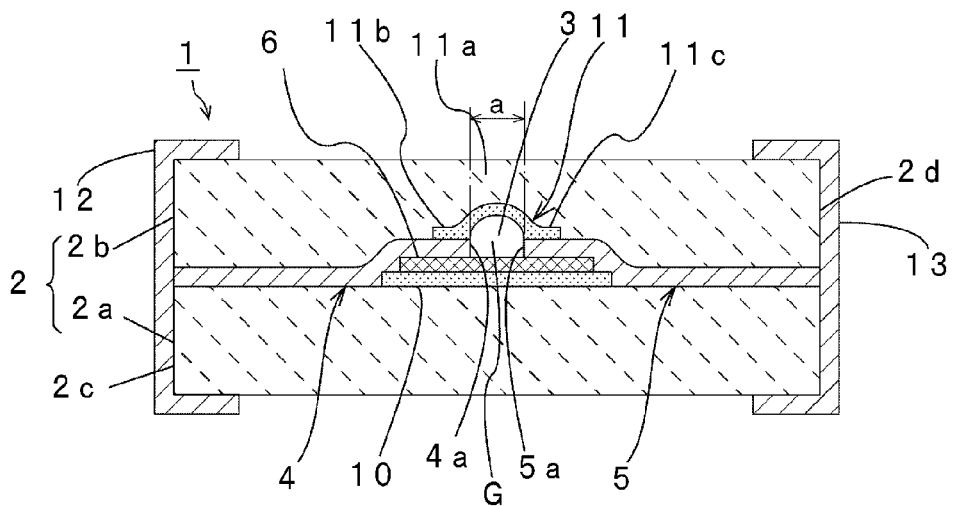
FIG. 1B is a front sectional view of the ESD protection device according to the first preferred embodiment.

FIG. 1A is a plan sectional view of an ESD protection device according to a first preferred embodiment of the present invention, and FIG. 1B is a front sectional view of the ESD protection device.

As illustrated in FIG. 1B, an ESD protection device 1 includes a ceramic multilayer substrate 2. The ceramic multilayer substrate 2 includes a first substrate layer 2a and a second substrate layer 2b stacked on the first substrate layer 2a. As will be apparent from a manufacturing method described later, a ceramic multilayer substrate is obtained preferably by stacking multiple ceramic green sheets and firing them. The first substrate layer 2a and the second substrate layer 2b are preferably made of the same ceramic material. Therefore, the ceramic multilayer substrate 2 can be obtained by stacking multiple ceramic green sheets with the same composition and firing them. In this case, because the first and second substrate layers 2a and 2b preferably have the same composition, the first and second substrate layers 2a and 2b exhibit an equivalent shrinkage behavior when fired. Alternatively, the first substrate layer 2a and the second substrate layer 2b may be made of different ceramic materials, for example.

A ceramic material for constituting the above-described ceramic multilayer substrate 2 is not particularly limited. In the present preferred embodiment, the so-called BAS material including Ba, Al, and Si as components or a low-temperature co-fired ceramic (LTCC) is preferably used, for example.

A cavity 3 is preferably provided in the ceramic multilayer substrate 1. The cavity 3 is formed preferably by causing resin provided at a portion where the cavity 3 is positioned to disappear by heating the resin when firing the ceramic multilayer substrate 2, which will be described later.

A first discharge electrode 4 and a second discharge electrode 5 are provided on the first substrate layer 2a. The first and second discharge electrodes 4 and 5 are preferably made of Cu, for example.

The first discharge electrode 4 extends from a first end surface 2c of the ceramic multilayer substrate 2 toward the cavity 3. Also, the second discharge electrode 5 extends from a second end surface 2d, which is on the side opposite to the first end surface 2c, toward the cavity 3 side. As illustrated in FIG. 1A, the first and second discharge electrodes 4 and 5 preferably have rectangular or substantially rectangular strip-shaped planar shapes. A tip 4a of the first discharge electrode 4 and a tip 5a of the second discharge electrode 5 face each other across a gap G. The size of the gap along a direction in which the first and second discharge electrodes 4 and 5 face each other is denoted by a.

In the ESD protection device 1 according to the present preferred embodiment, discharge occurs when static electricity is applied between the tips 4a and 5a of the first and second discharge electrodes 4 and 5. This discharge includes creeping discharge and aerial discharge. To adjust the discharge voltage of the creeping discharge, a discharge auxiliary electrode 6 is provided.

The discharge auxiliary electrode 6 is arranged to electrically connect the first and second discharge electrodes 4 and 5. More specifically, the discharge auxiliary electrode 6 is arranged to contact the underside of the first discharge electrode 4, in a portion near the tip 4a of the first discharge electrode 4. Also, the discharge auxiliary electrode 6 is arranged to contact the underside of the second discharge electrode 5, near the tip 5a of the second discharge electrode 5.

Figure 1C:
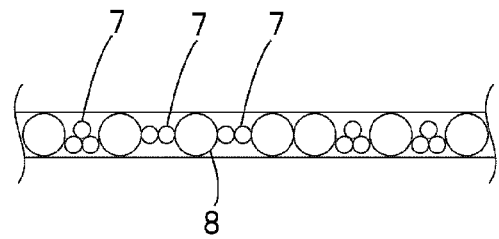
FIG. 1C is a partially cutaway enlarged front sectional view illustrating an auxiliary electrode.

The discharge auxiliary electrode 6 includes a conductive particle dispersed body in which metal particles whose surface is coated with an inorganic material having no electric conductivity, and ceramic materials, are dispersed. More specifically, the discharge auxiliary electrode 6 is formed preferably by firing a thick film paste including metal particles whose surface is coated with an inorganic material having no electric conductivity, and ceramic particles. FIG. 1C is a schematic partial enlarged front sectional view illustrating the details of the discharge auxiliary electrode 6. In the discharge auxiliary electrode 6, as has been described above, metal particles 8 whose surface is coated with an inorganic material powder having no electric conductivity, and a ceramic material 7, are dispersed. The metal particles 8 are preferably made of appropriate metal such as Cu or Ni, or made of alloy, for example. The diameter of the metal particles 8 is not particularly limited, but is preferably about 2 μm to about 3 μm, for example. Also, the above-described inorganic material powder is not particularly limited, and may be an appropriate insulating inorganic material. Such an inorganic material may be $Al_2O_3$ or other suitable material, for example.

The diameter of such an inorganic material powder is smaller than that of the metal particles 8. For example, $Al_2O_3$ particles having a diameter of about 1 μm or less, for example, are preferably used.

Also, the ceramic material 7 preferably includes silicon carbide in the present preferred embodiment. In order to enhance the ESD responsiveness, it is preferable that the ceramic material 7 be particles made of a semiconductor ceramic such as silicon carbide. Such a semiconductor ceramic preferably includes carbide such as titanium carbide, zirconium carbide, molybdenum carbide, or tungsten carbide, nitride such as titanium nitride, zirconium nitride, chromium nitride, vanadium nitride, or tantalum nitride, silicide such as titanium silicide, zirconium silicide, tungsten silicide, molybdenum silicide, or chromium silicide, boride such as titanium boride, zirconium boride, chromium boride, lanthanum boride, molybdenum boride, or tungsten boride, or oxide such as zinc oxide or strontium titanate, for example. In particular, silicon carbide is particularly preferable since silicon carbide is relatively inexpensive, and particles with various particle diameters are on the market.

Only one type of ceramic material including the above-described semiconductor ceramic may be used, or a combination of two or more types of semiconductor ceramics may be used, for example. Further, the ceramic material 7 including the above-described semiconductor ceramic may be mixed with an insulating ceramic material such as alumina, for example.

Because the metal particles 8 whose surface is coated with the inorganic insulating material powder are dispersed in the ceramic material 7, the discharge start voltage in a discharge including creeping discharge between the tip 4a of the first discharge electrode 4 and the tip 5a of the second discharge electrode 5 can be significantly reduced. Therefore, protection from static electricity can be more effectively performed. A portion where the first discharge electrode 4 and the second discharge electrode 5 face each other across the gap G faces into the cavity 3, as illustrated of FIG. 1B. Therefore, in the cavity 3, discharge occurs by utilizing creeping discharge and aerial discharge, and thus protection from static electricity is reliably performed.

Also, in the present preferred embodiment, a bottom sealing layer 10 is provided on the underside of the above-described discharge auxiliary electrode 6. Similarly, a top sealing layer 11 is provided on top of the cavity 3.

The bottom sealing layer 10 and the top sealing layer are preferably made of a ceramic with a higher sintering temperature than that of the ceramic constituting the ceramic multilayer substrate 2. In the present preferred embodiment, the bottom sealing layer 10 and the top sealing layer 11 are preferably made of $Al_2O_3$, for example. A ceramic material constituting the sealing layers are not particularly limited, as long as they have a sintering temperature higher than that of the ceramic material constituting the ceramic multilayer substrate 2.

In the present preferred embodiment, the bottom sealing layer 10 is provided on the top side of the first substrate layer 2a, and the above-described discharge auxiliary electrode 6 is stacked on the bottom sealing layer 10. The top side of the discharge auxiliary electrode 6 faces the cavity 3. That is, the underside of the cavity 3 serves as the top side of the discharge auxiliary electrode 6. In contrast, the top side of the cavity 3 is covered with the top sealing layer 11.

The first and second discharge electrodes 4 and 5 are electrically connected to outer electrodes 12 and 13, respectively, which are provided on the end surfaces 2c and 2d, facing each other, of the ceramic multilayer substrate 2.

One of the unique characteristics of the present preferred embodiment resides in the point that, as illustrated in FIG. 1B, the tip 4a of the first discharge electrode 4 and the tip 5a of the second adjudge electrode 5 coincide with end surfaces of the cavity 3. Therefore, the external shape of the cavity 3 is defined by the top side of the discharge auxiliary electrode 6, tip surfaces of the tips 4a and 5a of the first and second discharge electrodes 4 and 5, and the underside of the top sealing layer 11 in the front sectional view illustrated in FIG. 1B.

The top sealing layer 11 includes a portion 11a constituting the top side of the cavity 3, an extended portion 11b reaching the top side of the first discharge electrode 4, and an extended portion 11c reaching the top side of the second discharge electrode 5.

Therefore, the gap G where the tips 4a and 5a of the first and second discharge electrodes 4 and 5 face each other and a portion of the discharge auxiliary electrode 6 facing the gap G, that is, a main portion that performs discharge when static electricity is applied, are/is surrounded by the bottom sealing layer 10 and the top sealing layer 11. The bottom sealing layer 10 and the top sealing layer 11 are preferably made of a ceramic with a relatively high sintering temperature, as described above. Thus, glass components in the ceramic substrate can be prevented from permeating into and throughout the cavity interior. The glass components permeating through the ceramic substrate can be prevented from eroding the insulating material coating the auxiliary electrode material or the insulating material dispersed in the auxiliary electrode, thereby preventing reduction of the insulation between the discharge electrodes.

The top sealing layer 11 not only seals the top side of the cavity 3, that is, the top of the gap G, but also includes the extended portions 11b and 11c reaching the top side of the first and second discharge electrodes 4 and 5, as has been described above. Therefore, the upper portion of the gap G, where aerial discharge and creeping discharge occur, can be surely sealed with the top sealing layer 11.

Note that, as illustrated in FIG. 1A, the discharge auxiliary electrode 6 is provided in a region narrower than a region where the bottom sealing layer 10 is provided. Thus, a lower portion of the discharge auxiliary electrode 6 is surely sealed with the bottom sealing layer 10. Therefore, the effect of improving the resistance against short circuits, with the use of the bottom sealing layer 10, can be effectively enhanced. Alternatively, the bottom sealing layer 10 may be provided in a region narrower than the discharge auxiliary electrode 6.

Also, as illustrated in FIG. 1A, the width of the cavity 3 is between the width of the discharge auxiliary electrode 6 and the width of the bottom sealing layer 10.

One of the unique characteristics of the present preferred embodiment resides in the point that the tips 4a and 5a of the first and second discharge electrodes 4 and 5 are positioned at the edges of the cavity 3. Therefore, a portion near the tip 4a of the first discharge electrode 4 is sandwiched and held between the extended portion 11b of the top sealing layer 11 and the discharge auxiliary electrode 6. Therefore, even when discharge is repeatedly performed, the first discharge electrode 4 is less likely to peel off or to be raised at a portion near the tip 4a. Similarly in the second discharge electrode 5, a portion near the tip 5a is less likely to peel off or to be raised.

Therefore, in the ESD protection device 1, even when protection from static electricity is repeatedly performed, reduction of the discharge start voltage is less likely to occur. In recent years, ESD protection devices are expected to provide assured protection from static electricity even when discharge is repeated 1000 times. According to the present preferred embodiment, as described above, the resistance against repetition, upon protection from static electricity, can be effectively enhanced. Thus, semiconductor and electronic circuits can be surely protected from static electricity by using the ESD protection device 1 for a long period of time. This will be described on the basis of a non-limiting example of a specific experiment.

The BAS material including Ba, Al, and Si as principal elements was mixed to have a certain composition and was calcined at a temperature from 800° C. to 1000° C. The calcined powder obtained as a result was ground by a zirconium ball mill for 12 hours, thereby obtaining a ceramic powder. An organic solvent including toluene and ekinen was added to and mixed with the ceramic powder. Further, a binder and a plasticizer were added to obtain a slurry. The slurry obtained in this manner was shaped by using a doctor blade method to obtain a ceramic green sheet with a thickness of 50 µm.

An electrode paste for constituting the first and second discharge electrodes 4 and 5 was prepared as follows. A solvent was added to 80 mass % Cu particles with an average particle diameter of 2 µm, and to a binder resin made of ethyl cellulose, which was then stirred and mixed by a three roll mill, thereby obtaining an electrode paste.

Preparation of a paste for forming the discharge auxiliary electrode 6 will now be described. Metal particles whose surface is coated with an inorganic material having no electric conductivity were prepared by attaching an $Al_2O_3$ powder, with an average particle diameter of a few nm to a few tens of nm, to the surface of Cu particles with an average particle diameter of 2 µm. These metal particles were blended with a silicon carbide powder, with an average particle diameter of 1 µm, at a certain ratio. A binder resin and a solvent were added to and mixed with this compound so that the ratio of the total of the binder resin and the solvent becomes 20 mass % of the entirety, thereby obtaining a mixed paste.

As a resin paste for forming the cavity 3, a resin paste including, as a solvent, an organic solvent at a certain ratio with respect to polyethylene terephthalate (PET) was prepared.

As a ceramic paste for forming the bottom sealing layer and the top sealing layer 11, a ceramic paste for forming sealing layers, which was obtained by mixing an alumina powder and, as a solvent, an organic solvent at 15 mass % of the entirety, was prepared.

Multiple ceramic green sheets for forming a ceramic multilayer substrate, which were prepared as described above, were stacked on one another. On the multilayer body obtained, the ceramic paste for forming sealing layers was applied by screen printing to a portion constituting the bottom sealing layer 10. Next, the paste for forming an auxiliary electrode was applied onto the paste for forming sealing layers. Thereafter, the electrode paste was printed so that the size a of the gap G between the first and second discharge electrodes becomes 30 µm. Further, the resin paste for forming a cavity was applied. Next, the paste for forming sealing layers, which was for forming the top sealing layer, was applied to cover a portion where the resin paste was applied.

Further, multiple ceramic green sheets were stacked on one another on the top side, and the entirety was pressure-bonded in the thickness direction. In this manner, a multilayer body with an overall thickness of 0.25 mm was prepared.

Thereafter, the multilayer body was cut in the thickness direction to obtain multilayer body chips in units of ESD protection devices, each having a length of 1.0 mm, a width of 0.5 mm, and a thickness of 0.25 mm. Thereafter, an electrode paste was applied to first and second end surfaces of the multilayer body chips, thereby forming outer electrodes. As the electrode paste for forming outer electrodes, Cu was used.

Next, the multilayer body chips were fired in an atmosphere of nitrogen, thereby obtaining ESD protection devices.

Figure 10:
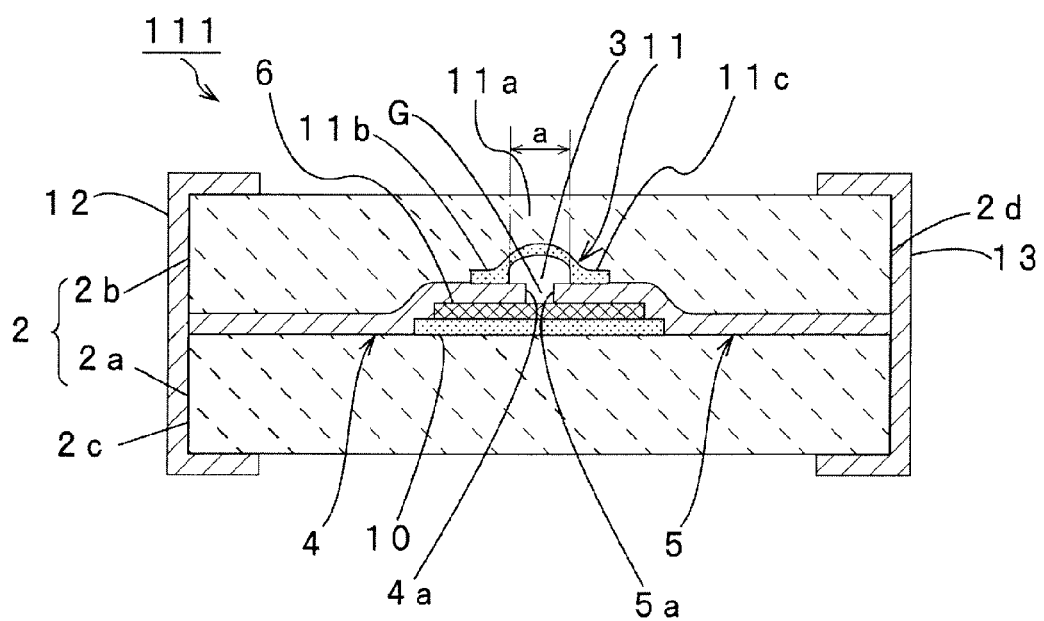
FIG. 10 is a front sectional view illustrating an ESD protection device of a comparative example.

As described above, the ESD protection device according to the present preferred embodiment was obtained. An ESD protection device 111 of a comparative example illustrated in FIG. 10 is the same as the ESD protection device 1 of the present preferred embodiment except for the point that the tips 4a and 5a of the first and second discharge electrodes 4 and 5 are positioned in the cavity 3. That is, the tips 4a and 5a of the first and second discharge electrodes 4 and 5 intrude into the cavity 3. Thus, in portions near the tips 4a and 5a of the first and second discharge electrodes 4 and 5, the top side of the first and second discharge electrodes 4 and 5 is exposed to the cavity 3. An amount X of protrusion of the tips 4a and 5a of the discharge electrodes 4 and 5 from edges of the cavity 3 was assumed to be 6 µm.

Figure 2:
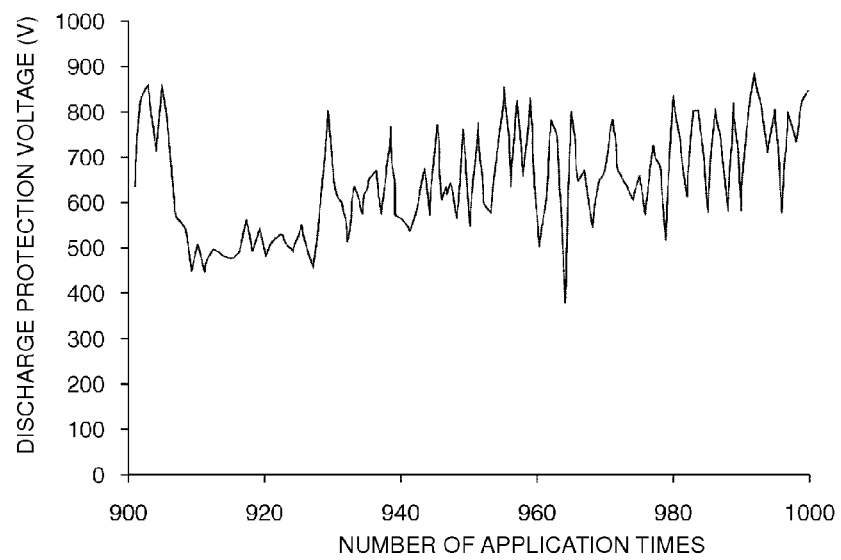
FIG. 2 illustrates the relationship between the discharge voltage of an ESD protection device of the related art, which is prepared for a comparative example, and the number of times a voltage application is repeated.
Figure 3:
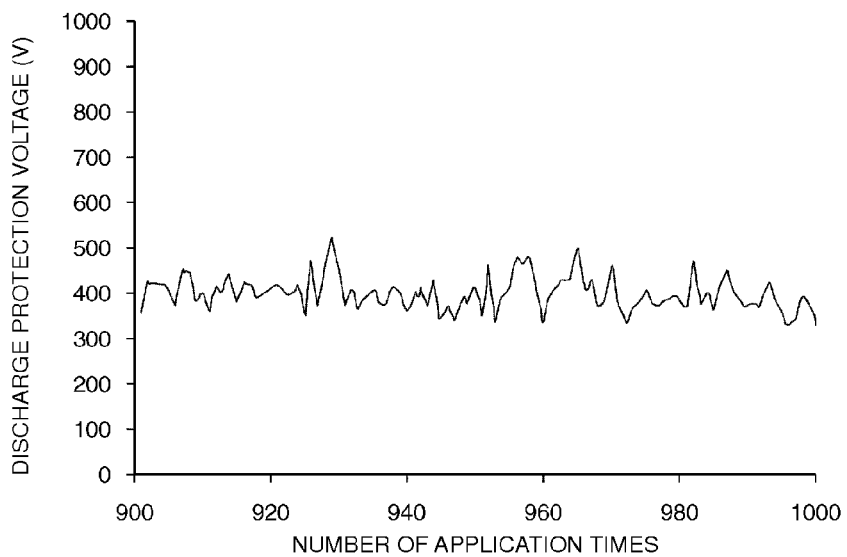
FIG. 3 illustrates the relationship between the discharge voltage of the ESD protection device according to the first preferred embodiment of the present invention and the number of times a voltage application is repeated.

To the ESD protection device 111 of the comparative example and the ESD protection device 1 according to the present preferred embodiment, high voltage was repeatedly applied, and the resistance against ESD repetition was evaluated. That is, in accordance with the IEC 61000-4-2, which is the IEC standard, a voltage of 8 kV was repeatedly applied at intervals of 5 seconds by using contact discharge, and the discharge protection voltage was measured. FIG. 2 illustrates the result of the comparative example, and FIG. 3 illustrates the result of the present preferred embodiment.

As apparent from FIG. 2, in the ESD protection device in FIG. 2, it is understood that the discharge protection voltage varies greatly from when the number of voltage application is 900 times to when the number of voltage application is 1000 times. In contrast, as illustrated in FIG. 3, according to the present preferred embodiment, it is understood that the discharge protection voltage hardly varies, even when voltage application is repeated up to 1000 times. This is considered as follows. Because the tips 4a and 5a of the first and second discharge electrodes 4 and 5 are positioned at the edges of the cavity 3, as described above, raising or peeling off near the tips 4a and 5a of the first and second discharge electrodes 4 and 5 is much less likely to occur.

Figure 4:
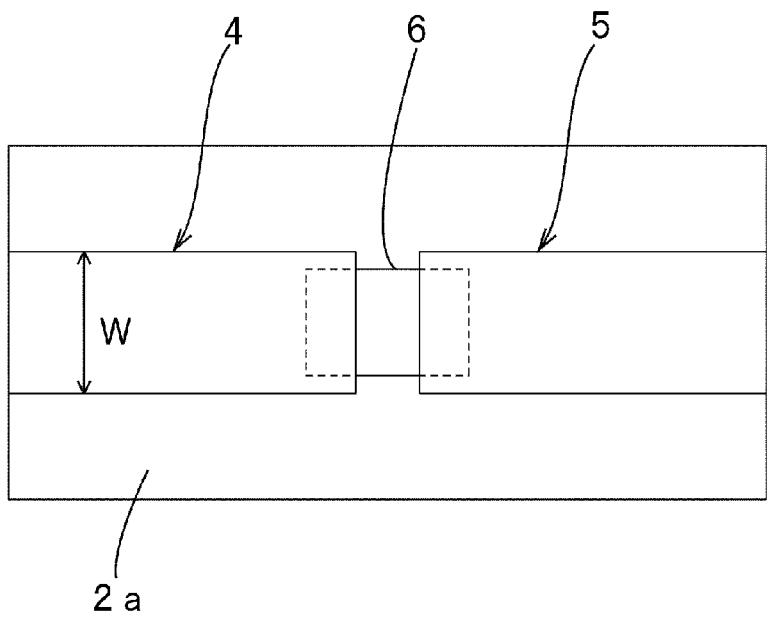
FIG. 4 is a schematic plan sectional view illustrating the shapes of first and second discharge electrodes and an auxiliary electrode of an ESD protection device according to a modification of the first preferred embodiment of the present invention.
Figure 5:
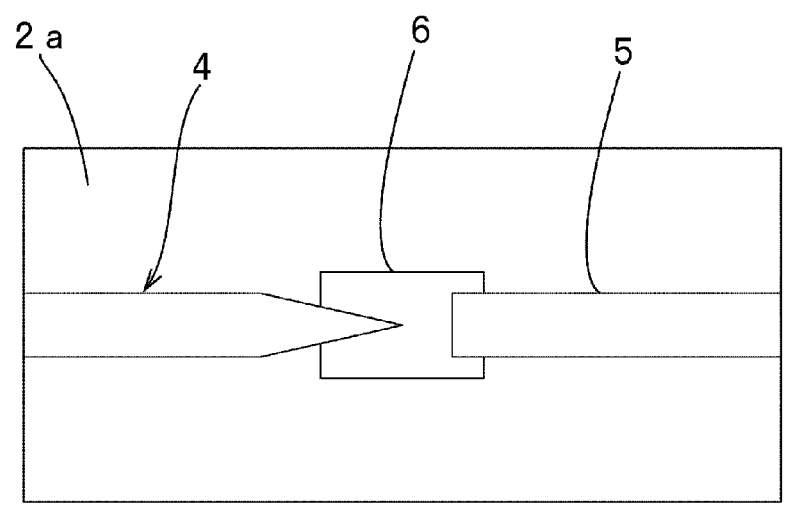
FIG. 5 is a plan sectional view for describing another modification of the ESD protection device according to the first preferred embodiment of the present invention.

FIGS. 4 and 5 are plan sectional views illustrating modifications of the present preferred embodiment.

As illustrated in FIG. 1A, the width W of the first and second discharge electrodes 4 and 5 is made narrower than the width of the discharge auxiliary electrode 6. In contrast, as illustrated in FIG. 4, the width of the discharge auxiliary electrode 6 may be narrower than the width of the first and second discharge electrodes 4 and 5. It is however preferable that the width of the discharge auxiliary electrode 6 be wider than the width of the first and second discharge electrodes 4 and 5. In this way, creeping discharge is further facilitated, thereby reducing the discharge start voltage.

In FIG. 1A, the tips 4a and 5a of the first and second discharge electrodes 4 and 5 preferably extend in the width direction. Alternatively, as in the first discharge electrode 4 illustrated in FIG. 5, the tip 4a may have a triangular shape when seen in plan view. Therefore, the shapes of the tips 4a and 5a of the first and second discharge electrodes 4 and 5 are not particularly limited.

Figure 6:
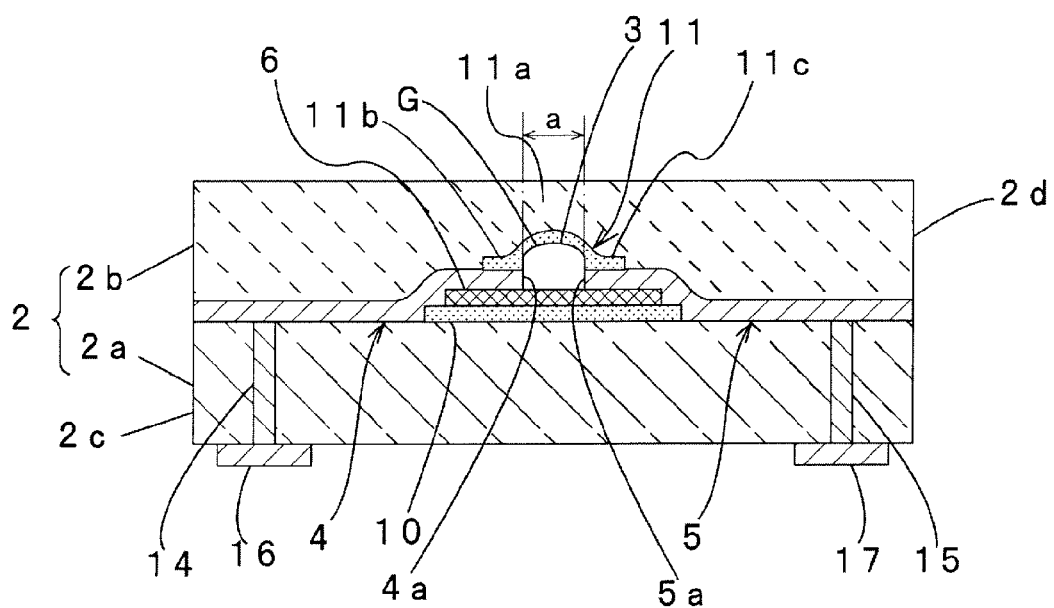
FIG. 6 is a sectional view for illustrating yet another modification of the ESD protection device according to the first preferred embodiment of the present invention.

Also, as in the modification illustrated in FIG. 6, via hole electrodes 14 and 15 may be provided in the ceramic multilayer substrate 2. Top portions of the via hole electrodes 14 and 15 are connected to the first and second discharge electrodes 4 and 5, respectively. Bottom portions of the via hole electrodes 14 and 15 are connected to outer electrodes 16 and 17, respectively, which are provided on the underside of the ceramic multilayer substrate 2.

Also in the present invention, materials constituting the ESD protection device are not limited to those disclosed in the above-described preferred embodiment.

Also, the ceramic material forming the ceramic multilayer substrate 2 is not limited to the BAS material, and another glass ceramic may be used. Such a glass ceramic includes forsterite and glass added thereto, or $CaZrO_3$ ceramic and glass added thereto. Also, the material is not limited to such a glass ceramic, and other insulating ceramic materials, such as $Al_2O_3$, may be used.

The ceramic material 7 used in the discharge auxiliary electrode 6 is not limited to silicon carbide, and various ceramic materials can be used.

Also, the electrode material constituting the first and second discharge electrodes 4 and 5 is not limited to Cu, and any of Ag, Pd, Pt, Al, and Ni can be appropriately used. Also, the first and second discharge electrodes 4 and 5 may have a multilayer structure formed by stacking multiple metal films.

The metal particles constituting the auxiliary electrode can be formed of metal similar to that constituting the discharge electrodes, or may be formed of an alloy, for example. Also, the inorganic material used to coat the surface of the metal particles is not limited to $Al_2O_3$, and an appropriate inorganic material having no electric conductivity can be used. Such an inorganic material includes $ZrO_2$, $SiO_2$, or other suitable material, for example.

Although the resin paste having PET as a principal element is preferably used for forming the cavity 3, a resin paste having another resin, such as an acrylic resin, as a principal element may be used. Alternatively, instead of a resin paste, another material such as carbon that disappears when fired may be used.

Although the bottom sealing layer 10 and the top sealing layer 11 are preferably provided in the present preferred embodiment, only one of the bottom sealing layer 10 and the top sealing layer 11 may be provided. Preferably, as in the present preferred embodiment, it is preferable to provide sealing layers both on top of and beneath the cavity 3.

Figure 7A:
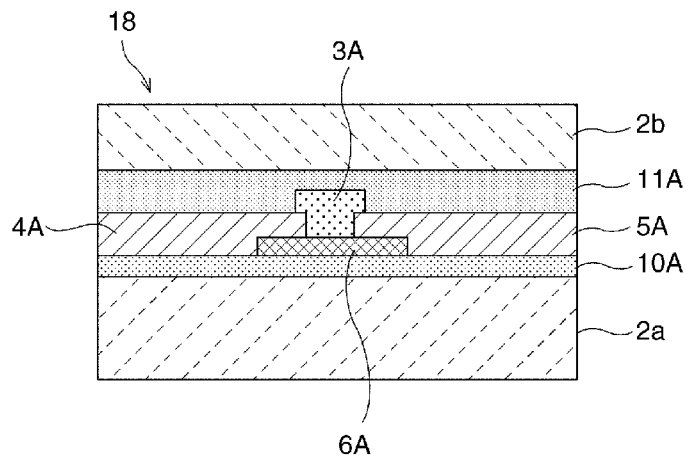
FIGS. 7A and 7B are schematic front sectional views illustrating a method for manufacturing the ESD protection device according to the first preferred embodiment of the present invention.
Figure 7B:
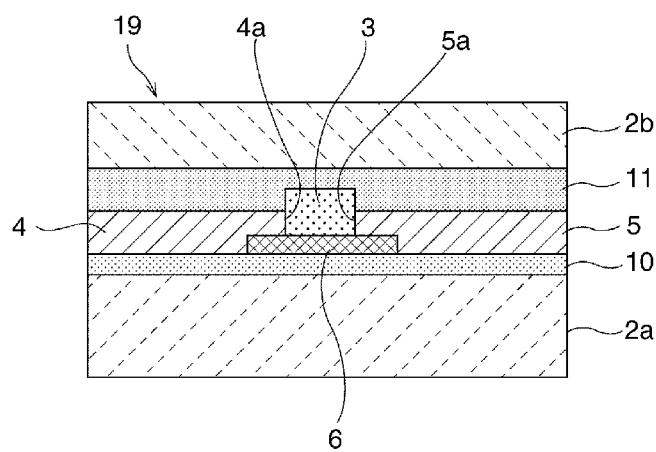
Figure 9A:
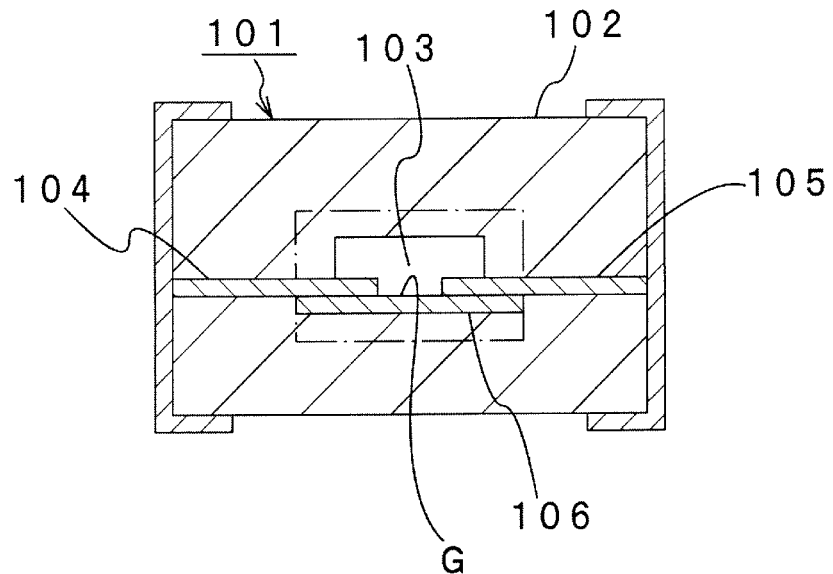
FIG. 9A is a front sectional view illustrating an example of an ESD protection device of the related art.
Figure 9B:
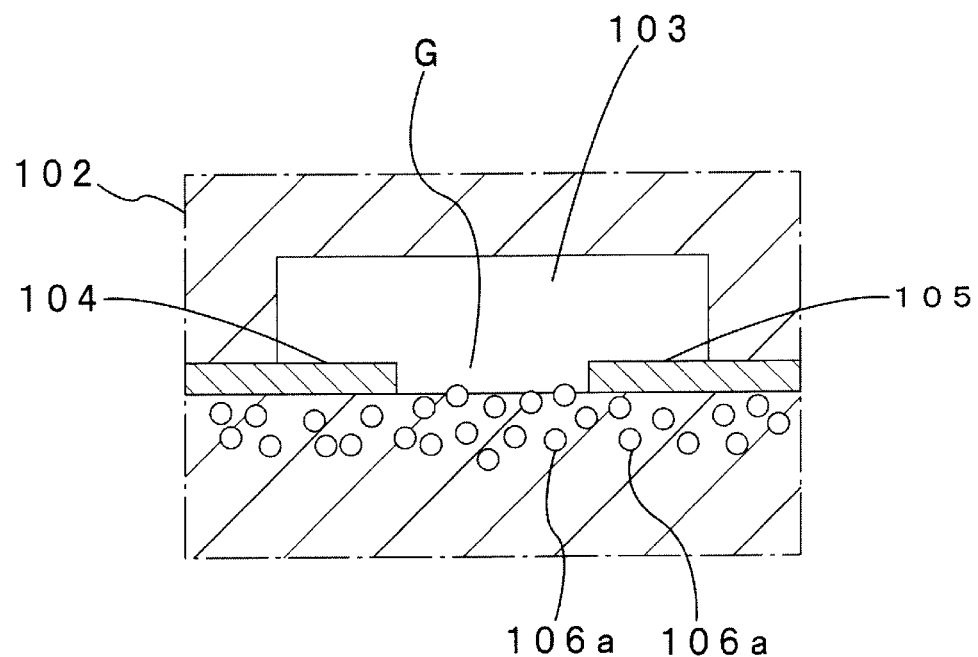
FIG. 9B is a front sectional view illustrating a main portion thereof.

Next, a non-limiting example of a method for manufacturing the ESD protection device 1 according to the present preferred embodiment of the present invention will be described. FIGS. 7A and 7B are schematic front sectional views illustrating an example of a method for manufacturing the ESD protection device 1. In FIGS. 7A and 7B, only a main portion of the ESD protection device 1 is schematically illustrated in order to plainly describe characteristics of the manufacturing method.

As illustrated in FIG. 7A, the first substrate layer 2a made of the BAS material, which is LTCC, is prepared. The first substrate layer 2a can be formed by, for example, the following method. At first, a calcined powder of the BAS material is mixed with an organic solvent, a resin binder, and a plasticizer, thereby obtaining a slurry. The slurry is shaped by an appropriate sheet shaping method such as a doctor blade method. In this manner, the first substrate layer 2a is formed by the ceramic green sheet including the BAS material as a principal element, or by stacking the above-described green sheets on one another.

Separately from this, a ceramic paste for forming the bottom sealing layer 10 is prepared. That is, a ceramic paste for forming a sealing layer, including an alumina powder and an organic solvent, is prepared. This ceramic paste 10A for forming a bottom sealing layer is applied onto the ceramic green sheet to obtain the first substrate layer 2a or is applied onto a ceramic green sheet multilayer body to obtain the first substrate layer 2a by using an appropriate method, such as screen printing.

Next, metal particles whose surface is coated with an inorganic material that has no electric conductivity, which are obtained by attaching much $Al_2O_3$ powder to the surface of the metal particles, are prepared. The average particle diameter of the metal particles is about 1 μm to 6 μm, though not particularly limited. The average particle diameter of the above-described $Al_2O_3$ powder is about a few nm to a few tens of nm. Therefore, an insulating film with a thickness of a few nm to a few tens of nm, which is made of $Al_2O_3$ or the like, is formed on the surface of the metal particles.

The metal particles whose surface is coated with the inorganic material having no electric conductivity are mixed with a ceramic powder whose average particle diameter is smaller than that of the metal particles. The average particle diameter of the ceramic powder may only need to be about 0.1 μm to 3 μm. Further, this is mixed with a binder resin and a solvent, thereby obtaining a paste for forming a discharge auxiliary electrode.

The paste for forming a discharge auxiliary electrode is applied by spray coating onto the ceramic paste 10A for forming a bottom sealing layer. Note that the applying method is not limited to spray coating.

As illustrated in FIG. 7A, a paste 6A for forming a discharge auxiliary electrode is applied so that the peripheral line of the paste 6A for forming a discharge auxiliary electrode is positioned on the inner side of the peripheral line of the paste 10A for forming a bottom sealing layer.

Next, electrode pastes 4A and 5A for forming the first and second discharge electrodes 4 and 5 are printed by screen printing or the like. In the present preferred embodiment, as described above, the first and second discharge electrodes 4 and 5 have Cu as a principal element. Therefore, electrode pastes including Cu particles, a binder resin, and a solvent are used as the above-described electrode pastes.

Note that the distance between the tips of the electrode pastes 4A and 5A is made narrower than the gap G between the first and second discharge electrodes 4 and 5 formed at the end.

Next, a resin paste 3A for forming a cavity is applied. As the resin paste 3A for forming a cavity, a resin paste including a plastic resin, which disappears at a firing temperature described later, and an organic solvent is used. The resin paste 3A is made thicker than the electrode pastes 4A and 5A, and the gap between the tips of the electrode pastes 4A and 5A is filled in by the resin paste 3A. Further, the resin paste 3A is applied not only to the gap G between the electrode pastes 4A and 5A, but also applied so as to extend over the top side near the tips of the electrode pastes 4A and 5A.

Next, a ceramic paste 11A for forming a top sealing layer is applied by screen printing or the like so as to cover the resin paste 3A and the electrode pastes 4A and 5A. The ceramic paste 11A for forming a top sealing layer is the same paste as the ceramic paste 10A for forming a bottom sealing layer, which has been described above.

Thereafter, at least one ceramic green sheet, which is the same as that used for forming the first substrate layer 2a, is stacked on the ceramic paste 11A for forming a top sealing layer. In this manner, the substrate layer 2b is formed. Accordingly, as above, a multilayer body 18 illustrated in FIG. 7A is obtained.

Thereafter, the multilayer body 18 is fired. By firing the multilayer body 18, a multilayer sintered body 19 illustrated in FIG. 7B is obtained. By firing the multilayer body 18, the resin paste 3A illustrated in FIG. 7A disappears, and the cavity 3 is formed. Also, the first and second discharge electrodes 4 and 5, the discharge auxiliary electrode 6, and the top and bottom sealing layers 10 and 11 are completed.

Upon firing the multilayer body 18, the electrode pastes 4A and 5A shrink. As a result, the positions of the tips 4a and 5a of the formed first and second discharge electrodes 4 and 5 coincide with the peripheral line of the cavity 3. In this manner, a structure in which the tips 4a and 5a of the first and second discharge electrodes 4 and 5 of the present preferred embodiment coincide with the peripheral line of the cavity 3 can be obtained.

In more detail, glass in the BAS material used to obtain the first substrate layer 2a enters the bottom sealing layer 10. Thus, the adhesion between the first substrate layer 2a and the bottom sealing layer 10 is relatively high. Therefore, the bottom sealing layer 10 is much less likely to shrink upon firing the multilayer body 18.

Also, the discharge auxiliary electrode 6 is an aggregate of the above-described metal particles and ceramic particles, and the discharge auxiliary electrode 6 bites the bottom sealing layer 10. In addition, the surface of the metal particles of the discharge auxiliary electrode is made of an alumina powder, which is the same material as the bottom sealing layer 10. Therefore, the discharge auxiliary electrode 6 is also less likely to shrink upon firing the multilayer body 18.

In contrast, because the first and second discharge electrodes 4 and 5 have metal particles as principal elements, the first and second discharge electrodes 4 and 5 shrink upon firing the multilayer body 18. The discharge electrodes 4 and 5 easily slide along the discharge auxiliary electrode 6. Therefore, as has been described above, the tips 4a and 5a recede due to the shrinkage upon firing of the multilayer body 18.

Therefore, by controlling the degree of shrinkage, as in the present preferred embodiment, a structure in which the tips 4a and 5a of the first and second discharge electrodes 4 and 5 coincide with the peripheral line of the cavity 3 can be obtained. Note that the degree of shrinkage can be easily achieved by adjusting the composition of the electrode pastes 4A and 5A, the paste 6A for forming a discharge auxiliary electrode, the paste 11A for forming a sealing layer, or the like.

In the preferred embodiment illustrated in FIG. 1A, the first and second discharge electrodes 4 and 5 extend in the length direction of the ESD protection device 1, and the tips 4a and 5a face each other across the gap G at the center in the length direction.

However, the shapes of the first and second discharge electrodes in the ESD protection device of a preferred embodiment of the present invention and the positions at which the first and second discharge electrodes are formed are not limited to the above.

FIG. 8A is a schematic plan view illustrating a main portion of an ESD protection device 21 according to a second preferred embodiment of the present invention, and FIG. 8B is a sectional view of the entirety of the ESD protection device 21 corresponding to a portion along the D-D line in FIG. 8A.

In the second preferred embodiment, a bottom sealing layer 23 and a discharge auxiliary electrode 24 are stacked on a first substrate layer 22a. The first substrate layer 22a, the bottom sealing layer 23, and the discharge auxiliary electrode 24 are preferably made of similar materials, in a similar manner, as in the first preferred embodiment.

The second preferred embodiment is different from the first preferred embodiment in a portion where first and second discharge electrodes 25 and 26 face each other. That is, given a length direction L, and a width direction W that is a direction orthogonal to the length direction L in FIG. 8A, the first discharge electrode 25 and the second discharge electrode 26 face each other across the gap G in the width direction W. That is, a tip 25a of the first discharge electrode 25 and a tip 26a of the second discharge electrode 26 facing each other across the gap G extend along the length direction L, and face each other in the width direction W. In such a structure, the length of a portion where the tips 25a and 26a of the first and second discharge electrodes 25 and 26 face each other across the gap G, that is, an opposing length Lx, can be elongated. That is, compared with the ESD protection device 1 according to the first preferred embodiment, in the ESD protection device 21 according to the second preferred embodiment, the opposing length Lx can be elongated, when the external dimensions are the same. In contrast, when the opposing lengths are the same, the dimension, along the length direction L, of the ESD protection device 21 can be shortened.

As has been described above, because the opposing length Lx can be elongated, the resistance against repetition, upon protection from static electricity, can be enhanced. More specifically, when discharge occurs due to application of static electricity between the tip 25a of the first discharge electrode 25 and the tip 26a of the second discharge electrode 26, melting or scattering of electrode materials occurs in a portion of, for example, the tip 26a of the discharge electrode 26 to which the static electricity has been applied. Therefore, the opposing distance is increased in that portion. However, the opposing distance remains the same in other portions. When static electricity is applied the next time, discharge occurs in the other portions. Thus, the longer the opposing length Lx, the higher the resistance against repetition becomes.

Note that, as illustrated in FIG. 8B, even in the second preferred embodiment, the tips 25a and 26a of the first and second discharge electrodes 25 and 26 coincide with the peripheral line of a cavity 28. In FIG. 8A, the position of the cavity 28 is schematically illustrated as a region hatched with oblique lines. As in the first preferred embodiment, the tips 25a and 26a of the first and second discharge electrodes 25 and 26 are less likely to be raised or to peel off.

Also in the second preferred embodiment, a top sealing layer 29 and a second substrate layer 30 are stacked in an upper portion. Such a structure is preferably the same as or similar to the top sealing layer 11 and the second substrate layer 2b of the first preferred embodiment.

Note that, as apparent from the description of the second preferred embodiment, in the present invention, because the tips of the first and second discharge electrodes are arranged to face each other across the gap, the tips refer to electrode edge portions facing each other across the gap.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ESD protection device comprising:
    a ceramic multilayer substrate including a cavity;
    first and second discharge electrodes provided in the ceramic multilayer substrate, the first and second discharge electrodes facing each other across a gap; and
    first and second outer electrodes provided on a surface of the ceramic multilayer substrate, the first and second outer electrodes being electrically connected to the first and second discharge electrodes, respectively; wherein
    a tip of the first discharge electrode and a tip of the second discharge electrode face each other across the gap, and the tips of the first and second discharge electrodes are positioned so as to be aligned with edges of the cavity or at positions receded from the edges of the cavity such that the tip of the first discharge electrode and the tip of the second discharge electrode do not extend into the cavity.

2. The ESD protection device according to claim 1, wherein the ceramic multilayer substrate includes a first substrate layer and a second substrate layer, the cavity is provided at a boundary between the first and second substrate layers, and the first and second discharge electrodes are provided on a surface of the first substrate layer that faces the second substrate layer.

3. The ESD protection device according to claim 1, further comprising an auxiliary electrode arranged in the ceramic multilayer substrate to connect the first discharge electrode with the second discharge electrode, the auxiliary electrode including a metal particle dispersed body including a surface that is coated with an inorganic material powder having no electric conductivity.

4. The ESD protection device according to claim 2, further comprising an auxiliary electrode arranged in the ceramic multilayer substrate to connect the first discharge electrode with the second discharge electrode, the auxiliary electrode including a metal particle dispersed body including a surface that is coated with an inorganic material powder having no electric conductivity.

5. The ESD protection device according to claim 3, wherein the auxiliary electrode is located on undersides of the first and second discharge electrodes.

6. The ESD protection device according to claim 4, wherein the auxiliary electrode is located on undersides of the first and second discharge electrodes.

7. The ESD protection device according to claim 3, wherein the auxiliary electrode is located in an upper portion of the cavity.

8. The ESD protection device according to claim 4, wherein the auxiliary electrode is located in an upper portion of the cavity.

9. The ESD protection device according to claim 3, wherein the auxiliary electrode further includes a ceramic material.

10. The ESD protection device according to claim 4, wherein the auxiliary electrode further includes a ceramic material.

11. The ESD protection device according to claim 5, wherein the auxiliary electrode further includes a ceramic material.

12. The ESD protection device according to claim 6, wherein the auxiliary electrode further includes a ceramic material.

13. The ESD protection device according to claim 7, wherein the auxiliary electrode further includes a ceramic material.

14. The ESD protection device according to claim 8, wherein the auxiliary electrode further includes a ceramic material.

15. The ESD protection device according to claim 1, wherein the ceramic multilayer substrate includes a glass component, and a sealing layer including a ceramic having a sintering temperature that is higher than that of a material constituting the ceramic multilayer substrate is provided in at least a portion of a region around the cavity in the ceramic multilayer substrate.

16. The ESD protection device according to claim 2, wherein the ceramic multilayer substrate includes a glass component, and a sealing layer including a ceramic having a sintering temperature that is higher than that of a material constituting the ceramic multilayer substrate is provided in at least a portion of a region around the cavity in the ceramic multilayer substrate.

17. The ESD protection device according to claim 3, wherein the ceramic multilayer substrate includes a glass component, and a sealing layer including a ceramic having a sintering temperature that is higher than that of a material constituting the ceramic multilayer substrate is provided in at least a portion of a region around the cavity in the ceramic multilayer substrate.

18. The ESD protection device according to claim 15, wherein the sealing layer includes a top sealing layer arranged to be exposed at a top side of the cavity, and the top sealing layer extends to top sides of the first and second discharge electrodes.

19. The ESD protection device according to claim 15, wherein the sealing layer includes a bottom sealing layer provided on undersides of the discharge electrodes.

20. The ESD protection device according to claim 1, wherein, given a length direction of the ceramic multilayer substrate and a width direction that is a direction orthogonal to the length direction, the tip of the first discharge electrode and the tip of the second discharge electrode facing each other across the gap extend along the length direction, and face each other in the width direction.

* * * * *